United States Patent
Steele et al.

(10) Patent No.: US 7,297,278 B2
(45) Date of Patent: Nov. 20, 2007

(54) METHODS FOR REMOVING METALS FROM WATER

(75) Inventors: Robert A. Steele, Pinole, CA (US); David J. Szykowny, Martinez, CA (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/254,008

(22) Filed: Oct. 19, 2005

(65) Prior Publication Data
US 2006/0108289 A1     May 25, 2006

Related U.S. Application Data

(60) Provisional application No. 60/620,532, filed on Oct. 20, 2004.

(51) Int. Cl.
    *B01D 61/00*     (2006.01)
    *B01D 65/01*     (2006.01)
    *B01D 21/01*     (2006.01)
    *B01D 1/00*     (2006.01)
    *B01D 63/00*     (2006.01)

(52) U.S. Cl. ............... 210/650; 210/651; 210/652; 210/636; 210/705; 210/727

(58) Field of Classification Search ........ 210/650, 210/651, 652, 636, 703, 705, 727, 321.75, 210/321.69, 321.6
See application file for complete search history.

(56) References Cited

U.S. PATENT DOCUMENTS

| | | | |
|---|---|---|---|
| 4,872,988 A * | 10/1989 | Culkin | 210/636 |
| 4,952,317 A * | 8/1990 | Culkin | 210/636 |
| 4,983,296 A * | 1/1991 | McMahon et al. | 210/603 |
| 5,014,564 A | 5/1991 | Culkin | |
| 5,192,456 A * | 3/1993 | Ishida et al. | 210/791 |
| 5,376,262 A | 12/1994 | Perry | |
| 5,482,625 A * | 1/1996 | Shimizu et al. | 210/321.84 |
| 5,575,915 A * | 11/1996 | Nakamura et al. | 210/631 |
| 5,725,767 A | 3/1998 | Culkin | |

(Continued)

OTHER PUBLICATIONS

Bureau of Reclamation, Technical Service Center, "Selenium Fact Sheet," Sep. 21, 2001, pp. 1-6, available from http://www.usbr.gov/pmts/water/media/pdfs/Se.pdf.

(Continued)

*Primary Examiner*—Ana Fortuna
(74) *Attorney, Agent, or Firm*—Madan Mossman & Sriram PC

(57) ABSTRACT

A device for separating metal components from a colloidal suspension or solution uses a vessel for holding the colloidal suspension or solution. A membrane impermeable to the selected metal components of a colloidal suspension or solution is sealed over a support to form a leaf element. The leaf element includes an outlet for the selected components of the colloidal suspension or solution and is extended into the colloidal suspension or solution. The leaf element is controllably vibrated simultaneously with application of a negative or positive pressure which is used to motivate permeation of the membrane by the liquid of the colloidal suspension or solution to purify it. Metals removed by the method include metals with an atomic number greater than 10 including and/or silicon. The colloidal suspension or solution may optionally contain a metal precipitator such as a dithiocarbamate and/or trithiocarbamate to aid in the separation.

16 Claims, 6 Drawing Sheets

U.S. PATENT DOCUMENTS

| | | | |
|---|---|---|---|
| 5,846,404 A | 12/1998 | Fong et al. | |
| 6,258,277 B1* | 7/2001 | Salmen et al. | 210/638 |
| 6,322,698 B1* | 11/2001 | Rios et al. | 210/321.75 |
| 6,325,939 B2* | 12/2001 | Strom et al. | 210/645 |
| 6,403,726 B1* | 6/2002 | Ward | 525/328.3 |
| 6,533,938 B1* | 3/2003 | DiIorio et al. | 210/651 |
| 6,592,708 B2* | 7/2003 | Vanell | 156/345.1 |
| 6,830,679 B2* | 12/2004 | Tsuihiji et al. | 210/87 |
| 6,872,305 B2* | 3/2005 | Johnson et al. | 210/257.2 |
| 7,014,770 B2* | 3/2006 | Umezawa et al. | 210/636 |
| 2003/0094426 A1* | 5/2003 | Umezawa et al. | 210/791 |
| 2003/0095894 A1* | 5/2003 | Umezawa et al. | 422/101 |

OTHER PUBLICATIONS

Dow Chemical, "DOWEX Resins for Separation of Selenium from Liquid Media," Feb. 23, 2004, available from http://www.dow.com/liquidseps/prod/pt_se.htm.

New Logic Research, "Membrane Filtration of Commercial Drinking Water: Case Study," 2004, available from http://www.vsep.com/pdf/Drinking Water.pdf.

* cited by examiner

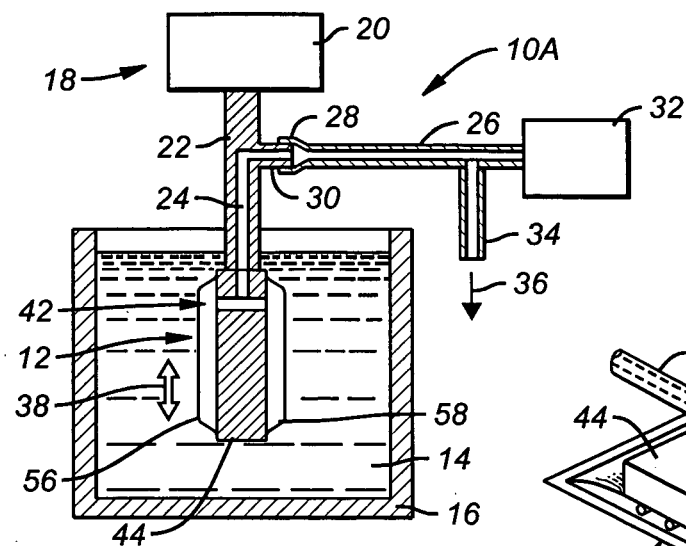
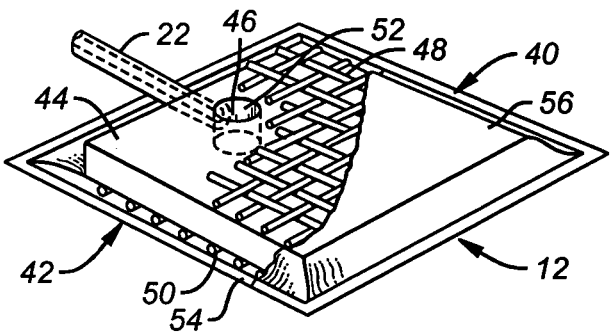
FIG. 1
FIG. 2
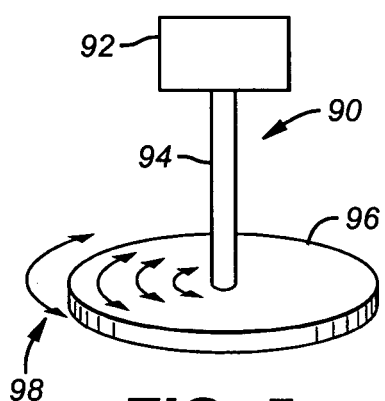
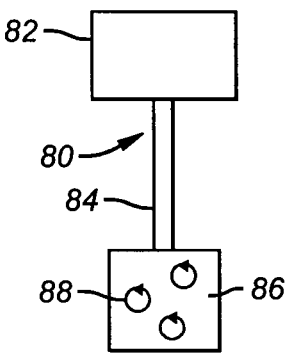
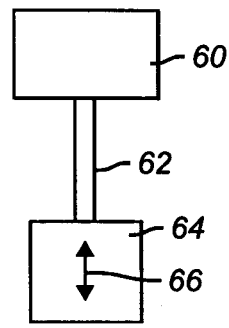
FIG. 5
FIG. 4
FIG. 3
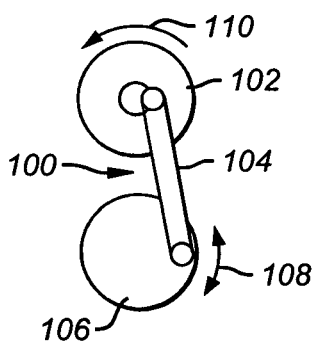
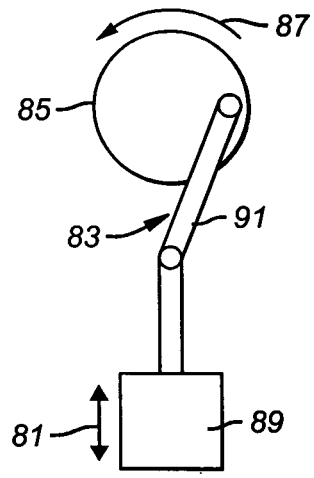
FIG. 7
FIG. 6

METHODS FOR REMOVING METALS FROM WATER

CROSS-REFERENCE TO RELATED APPLICATION

This application claims the benefit of U.S. provisional application No. 60/620,532 filed Oct. 20, 2004.

FIELD OF THE INVENTION

The invention relates to methods and apparatus for separating metals from colloidal suspensions or solutions, and most particularly relates, in one non-limiting embodiment, to systems and techniques for separating metals from water using vibrating membranes.

BACKGROUND OF THE INVENTION

Permeable and impermeable membranes have been used to separate ions, molecules, and solids from the liquid portion of the colloidal suspension or solution. Although filtration has been employed in this regard there is an ever present problem of plugging or fouling of the filter membrane. Methods of enhancing membrane permeate rates (dewatering rates) are found in the prior art. Such methods include the shearing of liquid slurry across the membrane in tangential flow i.e. crossflow filtration. This method uses a pump to force the feed slurry to flow tangentially to the dewatering membrane. The resulting sheer causes concentrated material, usually in the form of a filter cake, to be removed from the face of the membrane. Thus, the rate of liquid removal through the membrane is increased. Unfortunately, the provision of pumps to force the feed slurry in this manner requires expensive and bulky equipment and creates serious problems in the sealing of the vessel holding the colloidal suspension or solution.

Another method proposes the use of sonic vibration, created by ultrasonic transducers, to produce cavitation at the face of the membrane. A different technique proposes a shock-type system where the membrane support structure and a filtration apparatus are periodically shocked to induce the filter cake to drop from the membrane. A further process employs a shearing plate which is oscillated parallel to a fixed membrane. Further, an additional method teaches a system where a membrane is mechanically vibrated in a direction normal to the membrane. Alternatively, screening and sieving devices used in dry mineral and wet powder classification use screens vibrated parallel to the face of the screen to induce the powder to fall through the pores of the screen. None of these devices are suitable for separation of the components of a colloidal suspension or solution with the application of negative or positive pressure.

Ultrafilters manufactured by Millipore Corporation of Billerica, Mass. offer a system intended for separating proteins from aqueous solutions. The system utilizes a cylindrical probe which is inserted into a test tube containing the solution to be separated. The cylindrical wall of the probe is formed in part from a membrane material and the proteins pass through the filter from the solution occupying the annular volume between the probe and the test tube wall. The cylindrical probe is reciprocated over a small amplitude (less than 0.01 centimeters) and at 60 Hz. The shear created between the opposed walls of the probe and the test tube is partially effective in reducing plugging of the membrane by the proteins.

In general, the technique of cross-flow microfiltration and ultrafiltration is limited since shear rates above 20,000 $sec^{-1}$ of intensity are difficult to achieve. Such high intensities require a massive amount of power and the provision of entrance pressures which are uneconomical. Also, such membranes are often arrayed in a rectangular pressure vessel such as a plate and frame cross-flow device. The transmembrane pressure drop is limited by the inherently weak vessel walls.

A membrane filtration device which is able to produce a large shear intensity on the exterior or face of the membrane simultaneously with the application of a large pressure drop across the membrane to create high permeate rates would be a great advance in the art of filtration and metal component separation.

SUMMARY OF THE INVENTION

In accordance with the present invention a novel and useful method and device for concentrating, dewatering, or separating colloidal and molecular slurries containing metals through the use of membrane filtration, is provided.

A colloidal particle is generally defined as a particle possessing a size such that the dominant force influencing the particle motion in a liquid are surface forces; e.g. surface charge interaction, Van der Waals' forces, and the like. This normally occurs below a particle size of 50 microns. Practically, this definition includes finely divided clays, protein molecules, and ions.

In carrying out these and other objects of the invention, there is provided, in one non-limiting form, a device for separating metal components from a colloidal suspension or solution formed of liquids, ions and/or solid particles. The device includes a vessel capable of holding the colloidal suspension or solution and a membrane having an exterior surface and an interior surface, where the membrane is impermeable to a metal component of the colloidal suspension or solution. The metal in the metal component removed includes, but is not necessarily limited to, metals with atomics numbers greater than 10 and/or silicon and combinations thereof. The device also includes a support mounted at the interior surface of the membrane and sealed within the membrane, where the membrane and support member form a leaf element. The leaf element extends into the colloidal suspension or solution within the vessel, and the leaf element further includes an outlet for passage of the selected components of the colloidal suspension or solution permeating the membrane. The device additionally includes a mechanism for vibrating the leaf element tangentially along the exterior surface of the membrane to induce shearing between the exterior surface of the membrane and the colloidal suspension or solution. Also present is a mechanism for applying a pressure to motivate permeation of the membrane by a purified liquid of the colloidal suspension or solution.

Mechanisms for vibrating the leaf element include, but are not necessarily limited to, a vibrator and a rod or shaft which is connected to the support of the leaf element. Such rod may be hollow and, thus, conducts the permeates from the interior of the leaf element outwardly from the vessel. Alternatively, the leaf element may be fixed rigidly to a containment vessel and vibration may be applied to both the pressure vessel and the attached leaf element or to one or the other separately. In many cases, a plurality of leaf elements may be fixed within a pressure vessel and vibrated in this manner. In summary, the vibration in all cases, is applied approximately parallel to the leaf element to produce a shearing between the leaf element and the liquid slurry or colloidal suspension or solution in the vessel.

The leaf element or elements may be single-sided or double-sided. In the latter case, the support within the leaf member would be shaped to accommodate a plurality of faces on the membrane. In this regard, the support may be solid or of open construction i.e. a rigid screen.

A mechanism is also included in the present invention for applying a pressure influence to motivate or to urge permeation of the membrane by the permeates. Such pressure may be in the form of a vacuum communicating with the outlet of the leaf element or leaf elements; in such format the pressure vessel would be open to atmospheric pressure. On the other hand, the vessel may be constructed as a pressure vessel to accept a positive pressure which presses on the slurry or colloidal suspension or solution and, in turn, on the membrane to increase permeate transfer to the interior of the leaf element or elements.

It may be apparent that a novel and useful method and device for separating selective metal components from colloidal suspensions or solutions to give purified liquids has been described.

It is therefore an object of the present invention to provide a device and method for separating selected metal components and purified liquids from a colloidal suspension or solution which produces a very high permeate flow rate.

It is another object of the present invention to provide a device and method for separating selected metal components and purified liquids from a colloidal suspension or solution which includes a vessel that may be easily sealed for use with negative or positive pressure environments.

Another object of the present invention is to provide a device and method for the separation of selected metal components from a colloidal suspension or solution which employs a mechanism for vibrating the permeable membrane at varying frequencies commensurate with the shear characteristics of the colloidal suspension or solution being separated by the membrane.

Another object of the present invention is to provide a device and method for separating selective metal components from a colloidal suspension or solution which may employ a plurality of leaf elements in a pressure vessel holding the colloidal suspension or solution.

Yet another object of the present invention is to provide a device and method for separating selected metal components from a colloidal suspension or solution which substantially improves the filtering rates of colloidal suspensions or solutions by preventing plugging of the filter membrane in such filtration process.

Another object of the present invention is to provide a device and method for separation of selected metal components from a colloidal suspension or solution which employs a vibrator imparting linear, orbital, and/or torsional motion.

Another object of the present invention is to provide a device and method for separation of selected metal components from a colloidal suspension or solution which substantially improves the filtering rates of colloidal suspension or solutions by treating the colloidal suspension or solution with metal precipitators.

Yet another object of the present invention is to provide a device and method for separation of selected metal components from a colloidal suspension or solution which substantially increases the concentration of the selected metal components after permeation of the purified liquid through membrane by treating the colloidal suspension or solution with metal precipitators.

A further object of the invention is to provide a metal component concentrate stream that may be disposed of as a coker elutriant to quench coke in a coker unit, such as a delayed coker unit.

In carrying out these and other objects of the invention, there is provided, in another non-limiting form, a method of filtration of metal components from a colloidal suspension or solution that involves placing the colloidal suspension or solution in a vessel. The colloidal suspension or solution includes a metal component where the metal has an atomic number greater than 10 and/or silicon. A leaf element contacts or is immersed into the colloidal suspension or solution in the vessel, where the leaf element includes a membrane having an exterior surface and an interior surface, the membrane being impermeable to the metal component of the colloidal suspension or solution, the leaf element further including a support mounted at the interior surface of the membrane and sealed within the membrane. The method also involves vibrating the leaf element tangentially relative to the exterior surface of the membrane to induce shearing between the exterior surface of the membrane and the colloidal suspension or solution. A negative and positive pressure is applied to the leaf element to urge permeation of the membrane by a purified liquid of the colloidal suspension or solution. It is not necessary for the method to be accomplished in the sequence of steps described, that is, another order or sequence is acceptable as long as the purposes and goals of the method are achieved.

BRIEF DESCRIPTION OF THE DRAWINGS

FIG. 1 is a schematic sectional view of a first embodiment of the present invention utilizing a membrane leaf element;

FIG. 2 is a top perspective view with a portion broken away depicting the structure of a membrane leaf element employed in FIG. 1;

FIG. 3 is a schematic view representing the generation of linear vibratory motion;

FIG. 4 is a schematic view representing the generation of orbital vibratory motion;

FIG. 5 is a schematic view representing the generation of torsional vibratory motion;

FIG. 6 is a schematic view illustrating the conversion of flywheel rotary motion to linear vibratory motion;

FIG. 7 is a schematic view representing conversion of flywheel rotary motion to torsional vibratory motion;

Figure 8:
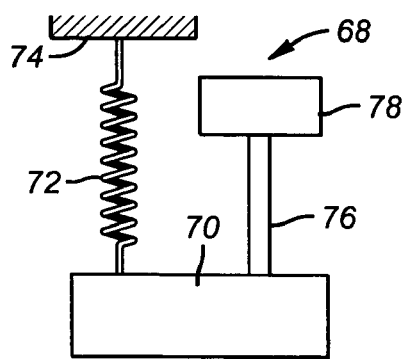
FIG. 8 is a schematic view representing a mechanical linear resonating vibrator.

It will be appreciated that the drawings are schematic and that the various elements are not necessarily to scale or proportion, and that many details have been removed or simplified for clarity, and thus the invention is not necessarily limited to the embodiments depicted in the FIGS.

DETAILED DESCRIPTION OF THE INVENTION

Various aspects of the present invention will evolve from the following detailed description of the various alternate embodiments which should be referenced to the prior described drawings. The invention as a whole is depicted in the drawings by reference character 10 and an upper case letter, to denote specific embodiments.

With reference to FIG. 1, filter device 10A is depicted. Filter device 10A includes as one of its elements a rectangular leaf element 12, the structure which will be discussed hereinafter. Leaf element 12 is submerged in a slurry or colloidal suspension or solution 14 found in open vessel 16.

Leaf element 12 is vibrated by vibration mechanism 18 which includes a linear vibrator 20 connected to a hollow rigid shaft 22. It should be noted that passageway 24 is employed to remove permeate from colloidal suspension or solution 14. Permeate then passes through flexible tubing 26 having flexible fitting 28 which is linked to spout 30. Vacuum pump 32 aids in the removal of permeate through conduit 34, per directional arrow 36. It should be apparent that rigid tube 22 serves a dual purpose. The first function is to transmit the vibratory motion from linear vibrator 20 to rectangular leaf element 12 along directional arrow 38. The second function of rigid tube 22 is to serve as a pipe or conduit for permeate entering rectangular leaf element 12.

Turning to FIG. 2, the construction of membrane leaf element 12 is shown in particular detail. Membrane leaf element 12 includes a pair of membrane filters 40 and 42. Colloidal suspension or solution, such as slurry 14, include a wide variety of particulates and molecules suspended and/or dissolved in a liquid phase. Such particles may vary in size from ions through proteins and large molecules with a molecular weight up to and including one million or more. The former may be separated by defining membranes 40 and 42 as a reverse osmosis membranes; the latter may be separated by defining membranes 40 and 42 as ultrafiltration membranes. Also, membranes 40 and 42 may take the form of microfiltration membranes to filter colloidal particles up to fifty microns in diameter. In general, membranes 40 and 42 are chosen to prevent passage of selected metal components of colloidal suspension or solution while allowing the passage of a purified liquid slurry or solution 14 i.e. permeate. In particular, the membranes 40 and 42 are selected to be impermeable to a metal component where the metal is one having an atomic number greater than 10 and/or silicon or combinations thereof. It is appreciated that silicon is strictly a non-metallic element, but for the purposes of this invention, it is grouped with the other metallic elements. Otherwise, it is understood herein that metal has its normal, chemical meaning. In one non-limiting embodiment, the metal component includes, but is not necessarily limited to, selenium, magnesium, aluminum, iron, copper, silicon, and/or zinc. The liquid phase of colloidal suspension or solution 14 may be aqueous or organic; aqueous being the most commonly encountered liquid phase. In this regard, membranes 40 and 42 may be constructed from a variety of materials depending on the strength, permeate selectivity, pore size, and chemical resistance, required for the particular application. Suitable materials may include natural substances, such as cellulose and natural rubber or polymeric substances such as non-polar polymers, such as polyethylene, polypropylene, polycarbonate, nylon, and the like. Membrane 40 and 42 may also be composed of polar polymers such as polyamides or inorganic substances such as sintered glass and ceramics. Moreover, sintered metal and chemically etched screens may also be used as a material for membranes 40 and 42. Membranes 40 and 42 are sealed or laminated to each other over support or plate 44. Support 44 may be constructed of a relatively rigid plastic material, metal, or other suitable materials. Support 44 is sufficiently rigid to transmit the vibratory forces generated by vibrator 20, FIG. 1, and carried along tube 22. Support 44 includes a bore 46 which accepts rigid tube 22. Tube 22 is glued, welded, or otherwise attached to support 44 through bore 46. In addition, leaf element 12 may include a pair of layers 48 and 50 of open weave cloth which may be laminated between membranes 40 and 42 and support 44. It should be noted that permeate migrating through membranes 40 and 42 also migrates through layers 48 and 50. Bore 46 terminates in an opening 52 in support 44 which communicates with both sides of support 44 adjacent layers 48 and 50. Opening 52 serves as a collection mouth for tube 22. It should be noted that the heretofore described lamination of parts of rectangular leaf element 12 may be accomplished along edge 54 by the use of adhesive, glues, welding, and any suitable technique. In essence, leaf element 12 is a unitary body such that the outer faces or surfaces 56 and 58 of rectangular leaf element vibrate with support member 44.

It will be appreciated that the method may be practiced with positive pressure on one side of the membranes 40, 42, negative pressure on one side of the membranes 40, 42 or positive pressure on one side and negative pressure on the other.

Although the motion imparted to leaf element 12 in FIGS. 1 and 2 is designated as being linear, such vibration may be orbital, or torsional. FIGS. 3-8 represents the generation of this variety of vibratory motions. FIG. 3 depicts a linear vibrator 60 imparting linear vibratory motion along shaft 62 to a body 64 according to directional arrows 66. FIG. 8 represents an electromechanical linear resonator 68. In such rendition, a mass 70 to be vibrated is connected to compression spring 72 which is fixed to a relatively immobile seismic mass 74. Rigid shaft 76 connects mass 70 to a linear motor 78 which forces mass 70 to vibrate at the resonant frequency of the spring-seismic mass 72/74 system. FIG. 6 depicts another method of producing linear vibration according to directional arrow 81. In this case, a linear motion generator 83 is depicted employing a flywheel 85 which rotates according directional arrow 87. Rotary motion of flywheel 85 is transmitted to mass or body 89 via double pivoting linkage 91.

Further, FIG. 4 depicts an orbital vibration generator 80 which utilizes an orbital vibrator 82, passing such vibration through rigid shaft 84 to body 86. Directional arrows 88 represent the orbital vibration imparted thereby.

Figure 9:
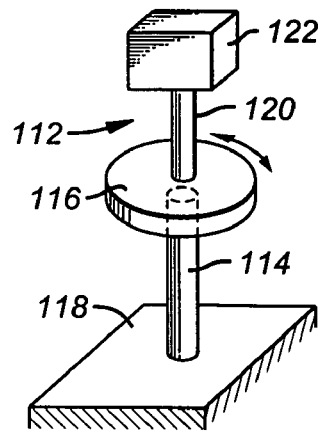
FIG. 9 is a schematic view of a mechanical resonating torsional vibrator.

FIG. 5 shows a generator of torsional motion or vibration 90 employing a torsional vibrator 92 which transmits such vibration along a torsion shaft 94 to a disk 96. Disk 96 vibrates according to directional arrows 98. Turning to FIG. 7 a mechanical engine 100 is depicted to convert the rotary motion of a flywheel 102 along shaft 104 to a body 106. Directional arrow 108 represents the eventual torsional motion generated by flywheel 102 which moves according to directional arrow 110. FIG. 9 depicts an electromechanical torsional resonator 112 in which a torsion spring 114 is connected to a disc-shaped mass or body 116. Torsion spring 114 is fixed to a relatively immovable seismic mass 118. Body 116 is linked to the shaft 120 of a permanent magnet motor 122. It should be noted that motor 122 is driven by an A.C. electrical current at the natural frequency of the torsional spring-mass 114, 118 system. It should also be pointed out that mass or bodies 64, 86, 96, 89, 106, 70, and 116, may schematically represent leaf element 12. Thus, any of the vibrational systems depicted in FIGS. 3-9 may be employed in the present invention 10.

Moreover, the force transducers (vibrators) schematically illustrated in FIGS. 3-9 are generally of at least two types: mechanical engines, and spring-mass resonators. The former produces a reciprocating motion by an arm attached through a bearing through a rim of a rotating flywheel. In the latter, the body to be vibrated is connected to a spring whose size and stiffness are chosen to create a mechanical resonation with the desired resonant frequency and safe deflection amplitude. In either case, the system 10 of the present invention provides a high shear intensity on the faces 56 and 58 of membranes 40 and 42. It should be noted that in certain cases only a single membrane may be used to form a leaf element. The details of the mechanics of such resonation will be discussed hereinafter.

Figure 10:
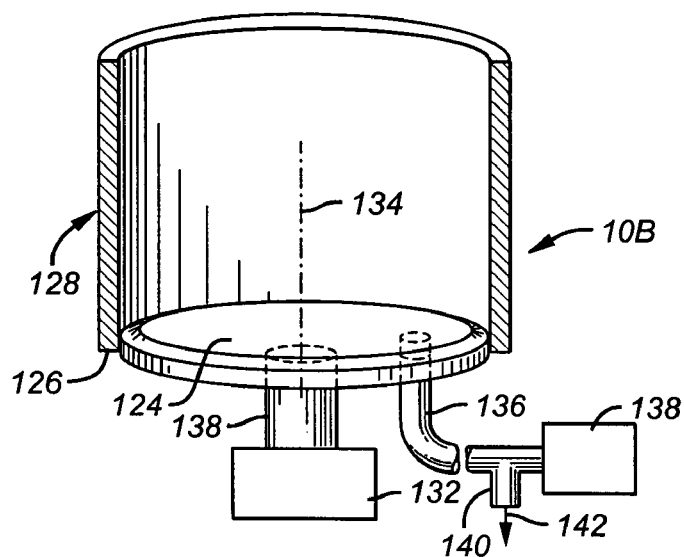
FIG. 10 is a top perspective view with a portion broken away illustrating a second embodiment of the present invention.

Turning to FIG. 10, another embodiment 10B of the present invention is depicted. Device 10B includes a membrane leaf element 124 which is placed at the bottom 126 of a cylindrical vessel 128. Vessel 128 takes the form of a Buchner funnel type of filtration apparatus. Membrane leaf element 124 and vessel 128 are attached to shaft 130 which is driven by torsional vibrator 132. As disk-shaped leaf element 124 and vessel 128 move in torsional vibration about the axis 134 of shaft 130, permeate is removed through vacuum port 136 by the pressure motivation afforded by vacuum pump 138. Permeate passes through spout 140 per directional arrow 142.

Figure 11:
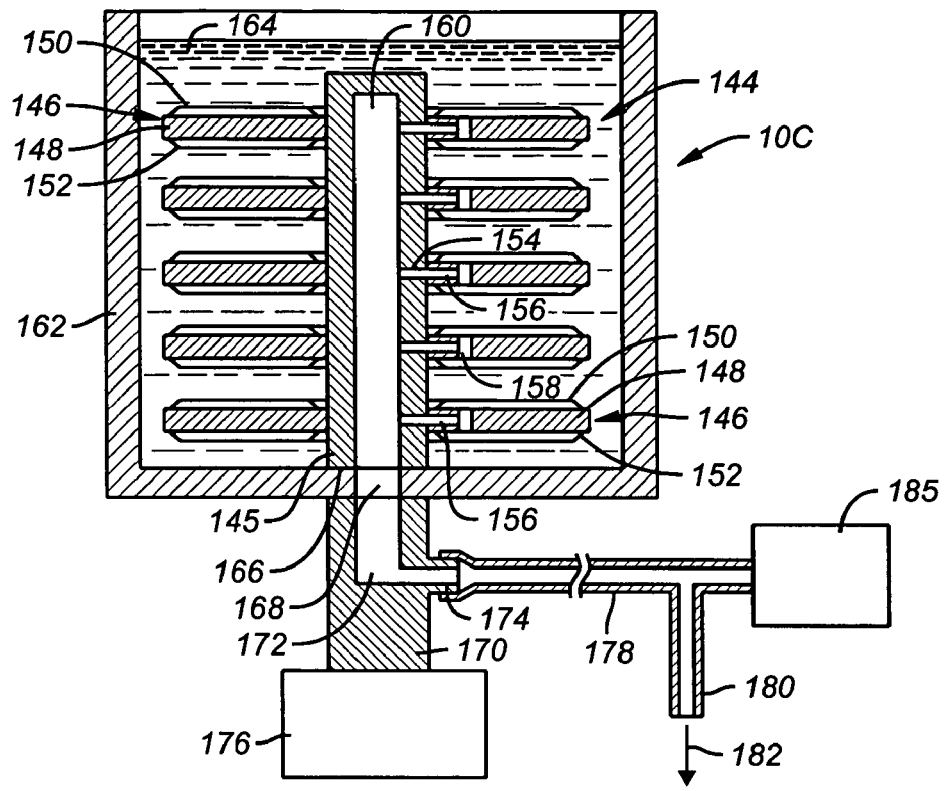
FIG. 11 is an axial sectional view of a third embodiment of the present invention utilizing multiple membrane leaf elements.

FIG. 11 shows embodiment 10C of the present invention in which a plurality of circular leaf elements 144 are connected to a central shaft 145. For example, disk-shaped element 146, similarly constructed to each of the plurality of leaf elements 144, includes a support structure 148 and a pair of membranes 150 and 152 laminated thereto. A shaft 154 possesses a passageway 156 which conducts permeate from opening 158 through support 148. Passageway 156 leads to a central passage 160 through shaft 145. Plurality of circular disk leaf elements 144 are each connected to central shaft 145 inside a cylindrical vessel 162. A slurry or colloidal suspension or solution 164 is poured inside vessel 162 to contact plurality of leaf elements 144. It should be noted that shaft 145 is rigidly attached to cylindrical vessel 162 at the base 166 by suitable fastening technique such as welding, gluing, fasteners, and the like. Of course, such attachment of 145 to vessel 162 would seal the escape of slurry 164 through opening 168 in vessel 162. Cylindrical vessel 162 is also connected to rigid drive shaft 170. Drive shaft 170 includes an L-shaped passageway 172 which exits shaft 170 at nipple 174. Shaft 170 is driven by torsional vibrator 176. Flexible tube 178 sealingly engages nipple 174 to complete the path of permeate from slurry 164 to outlet 180 according to directional arrow 182. In other words, vacuum pump 185 aids in the withdrawal of permeate from slurry 164 from open vessel 162, through central passage 160 of shaft 145, opening 168 in vessel 162, passage 172 of drive shaft 170, and through flexible tube 178 to outlet 180.

Figure 13:
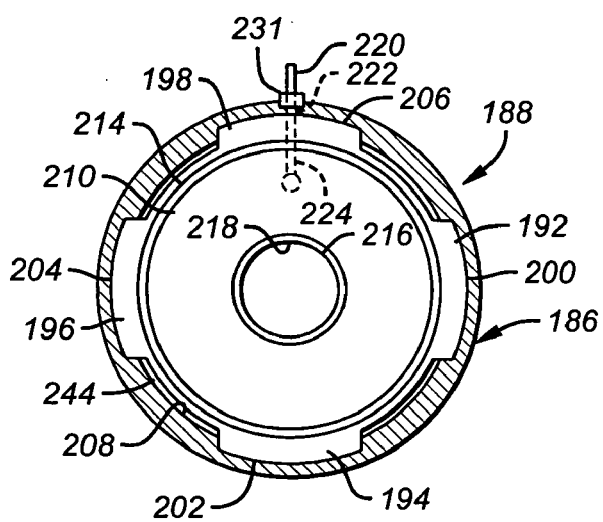
FIG. 13 is a sectional view taken along line 13-13 of FIG. 12.
Figure 12:
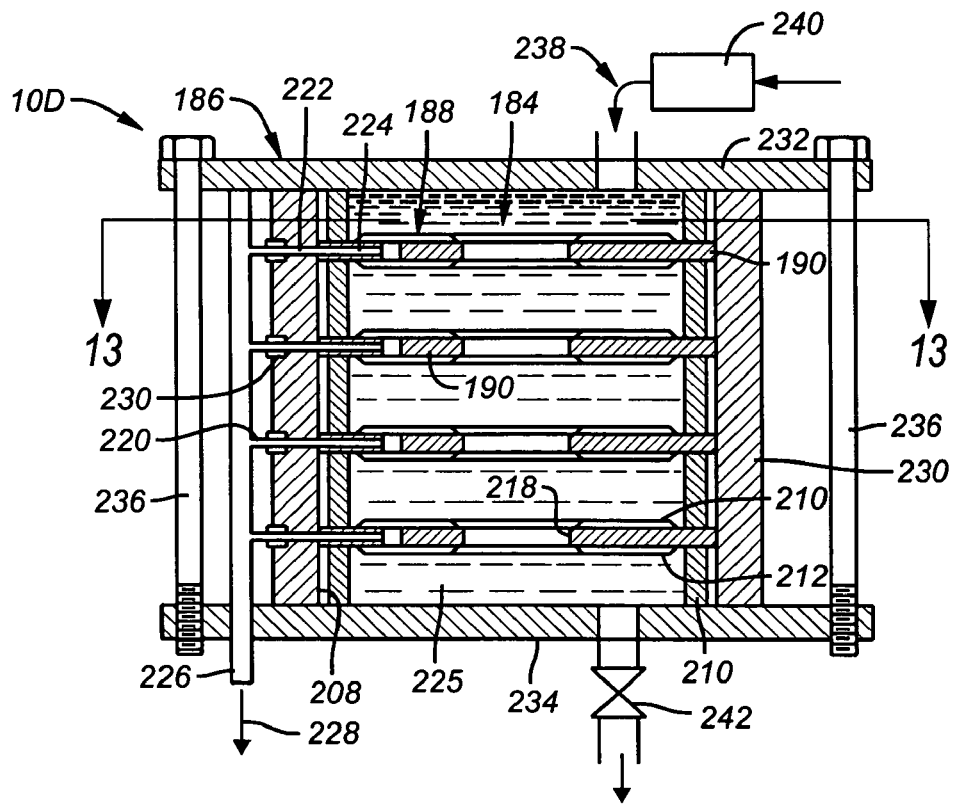
FIG. 12 is an axial sectional view of a fourth embodiment of the present invention utilizing multiple membrane leaf elements.

With reference to FIG. 12, another embodiment 10D of the present invention is depicted in which a plurality of disc-shaped leaf elements 184 are shown inside a cylindrical pressure vessel 186. With reference to FIG. 13, a detail of disc-shaped leaf element 188 is depicted. The support member 190 periphery terminates in a quartet of tabs 192, 194, 196, and 198. Each of the tabs engage a corresponding groove, such as grooves 200, 202, 204, and 206, which are machined into the side wall 208 of pressure vessel 186. A cylindrical support member 210 found within pressure vessel 186 permits the pre-stacking of plurality of leaf elements 184 to assure accurate fitting of the same within pressure vessel 186. Returning to FIG. 13, it may be seen that leaf element 188 is shaped as an annulus with a pair of membranes 210 and 212 heat sealed to outside rim 214 and inside rim 216 surrounding opening 218. It should be noted that membrane 212 is sealed in the same manner to the side opposite that shown in FIG. 13 of leaf element 184. Permeate removal tube 220 is inserted within leaf element 184 via opening 222 through pressure vessel 186 and passage 224 through support member 190. Permeate from slurry or colloidal suspension or solution 225 exits through tube 220 and passes to manifold 226 according to directional arrow 228. Pressure type bushing 231 seals any leakage through passage 222 outside of pressure vessel 186. The plurality of leaf elements 184 are similarly constructed to leaf element 188.

Returning to FIG. 12, it may be observed that pressure vessel 186 is formed of a cylindrical body 230 and a pair of plates 232 and 234. A multiplicity of long bolts 236 extend from top plate 232 to bottom plate 234, where threading engagement occurs. A mechanism 238 for pressure motivating the separation of slurry 225 may takes the form of a positive pressure pump, or other pressure-producing device, which applies pressure to slurry 225 and eventually to plurality of leaf elements 184. Bleed valve 242 permits the removal of concentrated material from pressure vessel 186. With reference to FIG. 13 it should be noted that each of the plurality of leaf elements 184 includes a gap 244 which permits circulation of slurry 225 within plurality of leaf elements 184. Of course, slurry 225 does not extend into the grooves machined into pressure vessel 186 to engage a quartet of tabs found in each of the plurality of leaf elements 184.

Figure 14:
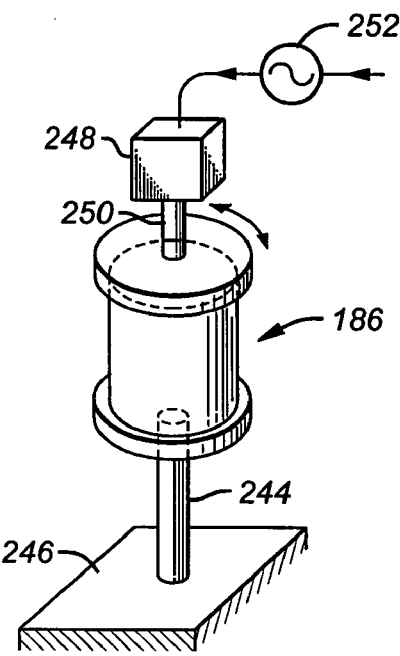
FIG. 14 is a schematic view depicting the operation of the fourth embodiment depicted in FIGS. 12 and 13.

Turning to FIG. 14, the pressure vessel 186 is schematically depicted, and is assumed to contain plurality of stacked leaf elements 184 as detailed in FIGS. 12 and 13. Pressure vessel 186 attaches to a torsion spring 244 which is itself rigidly attached to a large seismic mass 246. Torsional force transducer 248, which may be a brushless permanent magnet motor having a low inertia rotor, attaches to the top of pressure vessel 186 via shaft 250. Alternating current from source 252 drives force transducer 248 at the natural frequency of the torsional resonating system created by the heretofore described elements. It should be noted that torsional spring 244 may be a coil spring, torsion bar, or similar torsion spring element.

In operation, each of the embodiments of the present invention 10A, 10B, 10C and 10D are vibrated by vibration device or mechanism such as linear vibrator 20, torsional vibrator 132, torsional vibrator 176, and torsional force transducer 248, respectively. Respective leaf element or elements permit permeate to flow from each slurry containing vessel. In certain cases the flow of permeate is motivated by pressure mechanism such as a vacuum pump or a positive pressure pump. For example, in embodiments 10C and 10D, vacuum pump 185 and positive pressure pump 240 are used respectively in this way.

Each separation system of the present invention provides a high shear intensity on the outer surface or faces of the leaf element membranes without resort to cross-flow pumping of the colloidal suspension or solution or slurry held in a particular vessel. Vibration may be induced in both the membrane leaf elements and the surrounding pressure vessel. For example, in embodiments 10C and 10D, a simultaneous application of high shearing and high transmembrane negative or positive pressure can be achieved. As an example, vibration frequencies of about 70 hertz (Hz), with a displacement amplitude of 10 centimeters peak to peak, in combination with a transmembrane pressure drop of several hundred psi (or megapascals) have been produced by using a steel pressure vessel mounted to a torsion spring. The resulting higher permeate flow rate is achieved at a lower cost than cross flow systems. It is believed that the device and method employed in the present invention will produce shear intensities on the particular membrane leaf elements greatly in excess of those typically achieved by cross-flow devices or any of the vibrating filtration devices described in the prior art. It has been found that the particular vibration induced on the leaf element produces the same motion of liquid on the face or outer surface of the membrane leaf element being employed. In this regard, vibration is always applied to cause shearing between the membrane and the slurry or colloidal suspension or solution in which the membrane is immersed. Vibration is therefore applied tangentially to the face or outer surface of a particular leaf element. Liquid contacting the face of the membrane moves at exactly the velocity of the membrane due to the no-slip boundary conditions obeyed by all liquids. As one travels away from the face or outer surface of the membrane, fluid velocity amplitude decays exponentially as the envelope of a propagating shear wave. The decay length for the shear wave velocity amplitude may be expressed as follows:

$$L_s = (\mu/\rho\omega)^{1/2}$$

where $\mu$ is the slurry viscosity, $\rho$ is the slurry density and $\omega$ is the frequency of vibration in radians per second.

It should be noted that where the frequency of vibration f is expressed in Hz then $\omega = 2\pi f$ Within 3 or 4 decay lengths, (typically a fraction of a millimeter), the shear intensity is essentially zero. At this point the liquid is stationary. If the vibratory motion of the membrane leaf element is sinusoidal, the velocity of the membrane surface ($\mu$) can be written as:

$$\mu \approx \delta\omega \sin \omega t$$

where $\delta$ is the peak displacement of the membrane leaf away from its average position.

The shear intensity (S) on the face of the membrane can be calculated to be approximately $$S = 157 f^{1.5} \delta$$

in c.g.s. units. Thus, a vibratory filter in which the frequency of vibration is 10 Hz and peak displacement amplitude is 10 centimeters, will produce shearing on the face of the membrane of 49,000 seconds$^{-1}$. Equivalently, a membrane leaf element vibrating at 50 Hz with a displacement amplitude of 1 centimeter would produce a shear intensity of 55,000 sec$^{-1}$. Many combinations of frequency and displacement amplitude would produce the same level of shearing.

It has been determined experimentally that the permeate rate often increases proportionally to the square root of the shear intensity as defined herein, fixing the transmembrane pressure drop. The permeate rate also increases proportionally to the square root of the transmembrane pressure drop, fixing the shear intensity. If both shear intensity and transmembrane pressure are increased, the permeate rate increases proportional to the square root of the product of shearing times pressure. This implies that the highest permeate rate increase can be achieved by producing, simultaneously, a very intense shearing and a very large transmembrane pressure drop.

Ultimately, the maximum obtainable shear intensity obtainable with the present invention depends to a large degree in strength of material used in constructing the membrane leaf elements. The force acting on the leaf elements is proportional to the acceleration times the mass of the leaf elements:

$$F = ma$$

The peak acceleration is proportional to the frequency squared times the displacement. Thus, force acting on the leaf elements increases proportionally to frequency squared.

In the some non-limiting embodiments, one range of frequency induced by the vibratory devices described hereinabove ranges between about 5 Hz and about 300 Hz. It has been found that low frequency operation, although producing low "g" forces on the membrane leaf elements requires high displacement amplitudes. In certain cases such amplitudes may be difficult to control. Also, if the frequency induced on the membrane leaf elements is too low, the distances between parallel leaf elements stacked as depicted in FIGS. 11 and 12 must be increased. In other words, the zone of shear must be allowed to extend a greater distance from the outer surface or face of the membranes of the membrane leaf elements. It has also been found that increasing the frequencies of the embodiments depicted in the FIGS. produces a rather small increase shear intensity and a rather large increase in "g" forces above a frequency of about 300 Hz. However, other materials and arrangements may extend the heretofore described frequency range. Nevertheless, for the embodiments depicted, normal operation would typically take place between about 20 Hz and about 150 Hz. The low end of this range, at or about 20 Hz, may be employed to separate low viscosity slurries, especially those which are sensitive to shear, such as cellular suspensions. Conversely, the high end of the range, at or about 150 Hz, may be used to separate molecules in ultrafiltration and reverse osmosis applications. Also, such higher frequency may be employed to produce very high shear intensities in non-shear sensitive materials having high viscosity, such as in an application known as microfiltration of mineral clays. Commonly, the operating frequency of some non-limiting embodiments may range between about 40 Hz and about 70 Hz.

Likewise, the displacement amplitude of the vibration induced in any of the systems above described may be varied depending on whether the materials to be filtered are shear sensitive. Many living cells and molecules of biological importance are sensitive to shearing. In this case, the vibration displacement amplitude and/or operating frequency would have to be limited to produce a shearing of less than about 10,000-20,000 second$^{-1}$. Non-shear sensitive material such mineral clays can be processed at very high shear intensities of 500,000 second$^-$ or more. It is particularly advantageous in such application to simultaneously apply high shearing intensity and high transmembrane pressure to achieve a very high permeate flow rate.

In general, the method and devices described above improved the filtering of colloidal suspensions or solutions by avoiding the plugging of the filter membrane. It is believed that applying a rigorous shear flow at the interface between the filter and membrane and the suspension removes the concentrated polarization layer primarily responsible for plugging of the filter membrane.

It is further expected and discovered that the use of metal precipitator chemical additives in the colloidal suspensions or solutions will aid in the separation of the metal components therefrom. Such metal precipitators include, but are not necessarily limited to, dithiocarbamates, trithiocarbamates, iron salts, aluminum salts, potassium salts, sodium salts, copper salts, metal sulfides, and metal hydroxides and mixtures thereof. In one non-limiting embodiment of the invention the amount of metal precipitator used ranges from about 5 to about 50,000 ppm based on the colloidal suspension or solution, and in an alternate non-restrictive embodiment ranges from about 50 to about 5,000 ppm.

Other additives and agents may be used in the method of this invention including, but not necessarily limited to sequestering agents and dispersing agents. Suitable sequestering agents include, but are not limited to, aminocarboxylic acids such as ethylenediaminetetracetic acid (EDTA) and other chelates, whereas dispersing agents include, but are not limited to, sulfonates such as linear alkyl benzene sulfonate (LABS or sodium dodecylbenzenesulfonate).

The invention will now be described with respect to specific Examples which are not intended to limit it in any way but to rather further illustrate it.

EXAMPLE 1

Figure 15:
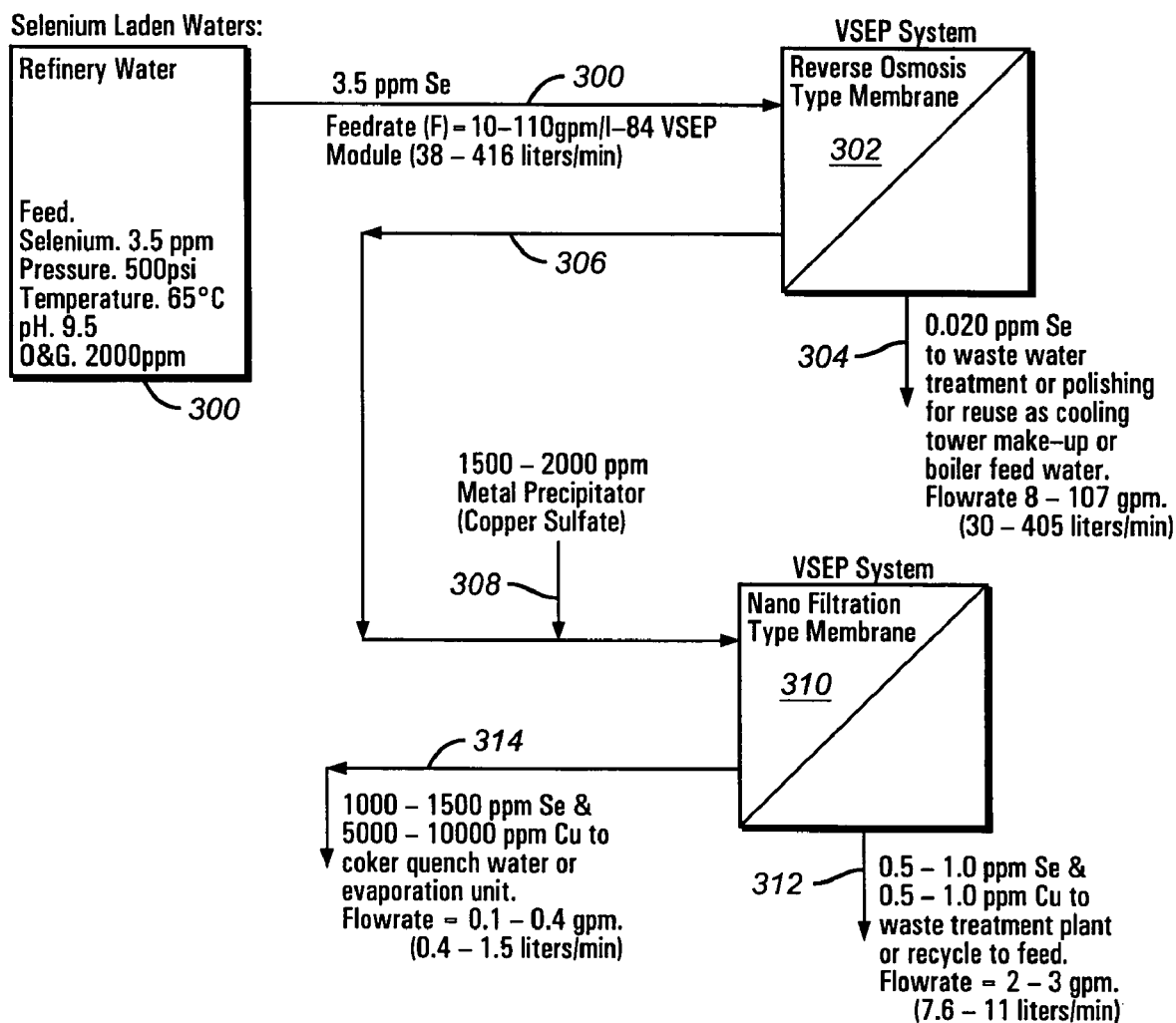
FIG. 15 is a block flow chart of one non-limiting separation method herein.

From the schematic flow diagram of FIG. 15, it may be seen that refinery water 300 having a pH of 9.5 and 3.5 ppm selenium with 2000 ppm O&G under a pressure of 500 psi (3.4 MPa) and at a temperature of 65° C. may be fed at a feed rate of 10-110 gpm (38-416 liters/min.) to an I-84 model Vibratory Shear Enhanced Processing (VSEP®) module from New Logic Research, Inc. As shown in FIG. 15, the refinery water first encounters a reverse osmosis-type membrane 302 in accordance with this invention and a stream of purified water 304 having about 0.020 ppm Se is removed. The fluid 306 then has 1500 to 2000 ppm of a metal precipitator 308 (e.g. copper sulfate) added thereto and the fluid 306 is treated at a flow rate of about 8-107 gpm (30-405 lpm) through a nano filtration-type membrane 310. Purified water 312 having about 0.5 to about 1.0 ppm Se and about 0.5 to 1.0 ppm Cu at a flow rate of about 2-3 gpm (7.6-11 lpm) is removed and sent to a waste treatment plant or recycled to the VSEP feed. A concentrate stream 314 having concentrated about 1000 to about 1500 ppm Se and about 5000 to about 10,000 ppm Cu at a flow rate of 0.1 to about 0.4 gpm (0.4-1.5 lpm) is removed to coker quench water or a re-evaporation unit.

EXAMPLE 2

Figure 16:
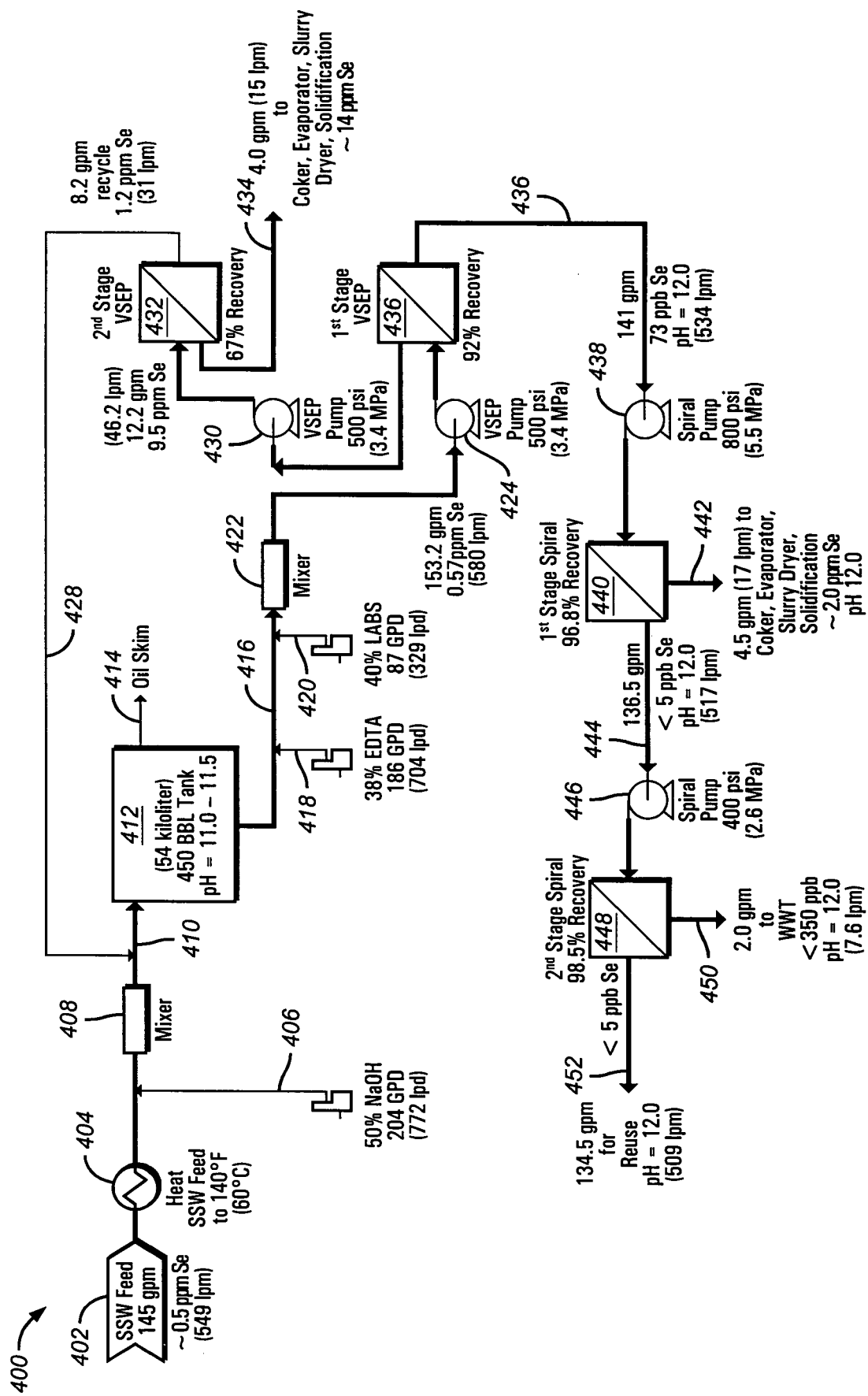
FIG. 16 is a block flow chart of another non-limiting embodiment separation method herein.

Shown in FIG. 16 is a VSEP Selenium Process Flow Diagram. It should be noted that the selenium numbers reported are the average of actual data. Based on this Example and 145 gpm (549 liters/minute or lpm) flow rate, approximately 0.8 pounds (0.36 kg) of Se/day were removed. The Se removal process is generally referred to in FIG. 16 as 400, where SSW (Stripped Sour Water) Feed 402 at a flow rate of 145 gpm (549 lpm) containing about 0.5 ppm Se was heated in heat exchanger 404 to 140° F. (60° C.). Line 406 injected 50% NaOH at 204 gpd (772 liters/day or lpd) as a metal precipitator prior to mixer 408 from which exited stream 410 to 450 bbl (54 kiloliter) tank 412 where the contents had a pH of 11.0 to 11.5. Oil was skimmed from tank 412 via line 414.

Exit line 416 has 38% ethylenediaminetetracetic acid (EDTA) introduced into it via line 418 at a rate of 186 gpd (704 lpd) and 40% linear alkyl benzene sulfonate (LABS or sodium dodecylbenzenesulfonate) injected into it via line 420 at a rate of 87 gpd (329 lpd) prior to mixer 422. EDTA was employed as a sequestering agent and LABS was used as a dispersing agent in Examples 2 and 3. VSEP pump 424 operated at 500 psi (3.4 MPa) to pump 153.2 gpm (580 lpm) stream from line 416 containing 0.57 ppm Se into first stage VSEP module 426 that operated at 92% recovery. Recycle line 428 from VSEP unit 426 was pumped using VSEP pump 430 operating at 500 psi (3.4 MPa) to pump 12.2 gpm (46.2 lpm) stream containing 9.5 ppm Se into second stage VSEP module 432 that operated at 67% recovery. Concentrate stream 434 containing approximately 14 ppm Se was removed to a coker, evaporator, slurry dryer or solidification process (not shown) at a rate of 4.0 gpm (15 lpm). Recycle line 428 carried a 8.2 gpm (31 lpm) stream containing 1.2 ppm Se back to stream 410.

Spiral pump 438 (operated at 800 psi/5.5 MPa) drew a purified stream 436 from first stage VSEP module 426 containing about 73 ppb Se at pH 12.0 at a rate of 141 gpm (534 lpm) and delivered it to first stage spiral wound membrane system 440 operated at 96.8% recovery. Concentrate stream 442 having about 2.0 ppm Se and pH 12.0 was withdrawn from system 440 at 4.5 gpm (17 lpm) to a coker, evaporator, slurry dryer or solidification process. Liquid stream 444 having less than 5 ppb Se at pH 12.0 was withdrawn by spiral pump 446 operating at 400 psi (2.6 MPa) for introduction into second stage spiral wound membrane system 448 operated at 98.5% recovery. Stream 450 having less than 350 ppb Se (pH=12.0) was withdrawn at 2.0 gpm (7.6 lpm) to waste water treatment (WWT). Finally, purified water stream 452 having less than 5 ppb Se (pH=12.0) was withdrawn from second stage membrane system 448 at 134.5 gpm (509 lpm).

EXAMPLE 3

Figure 17:
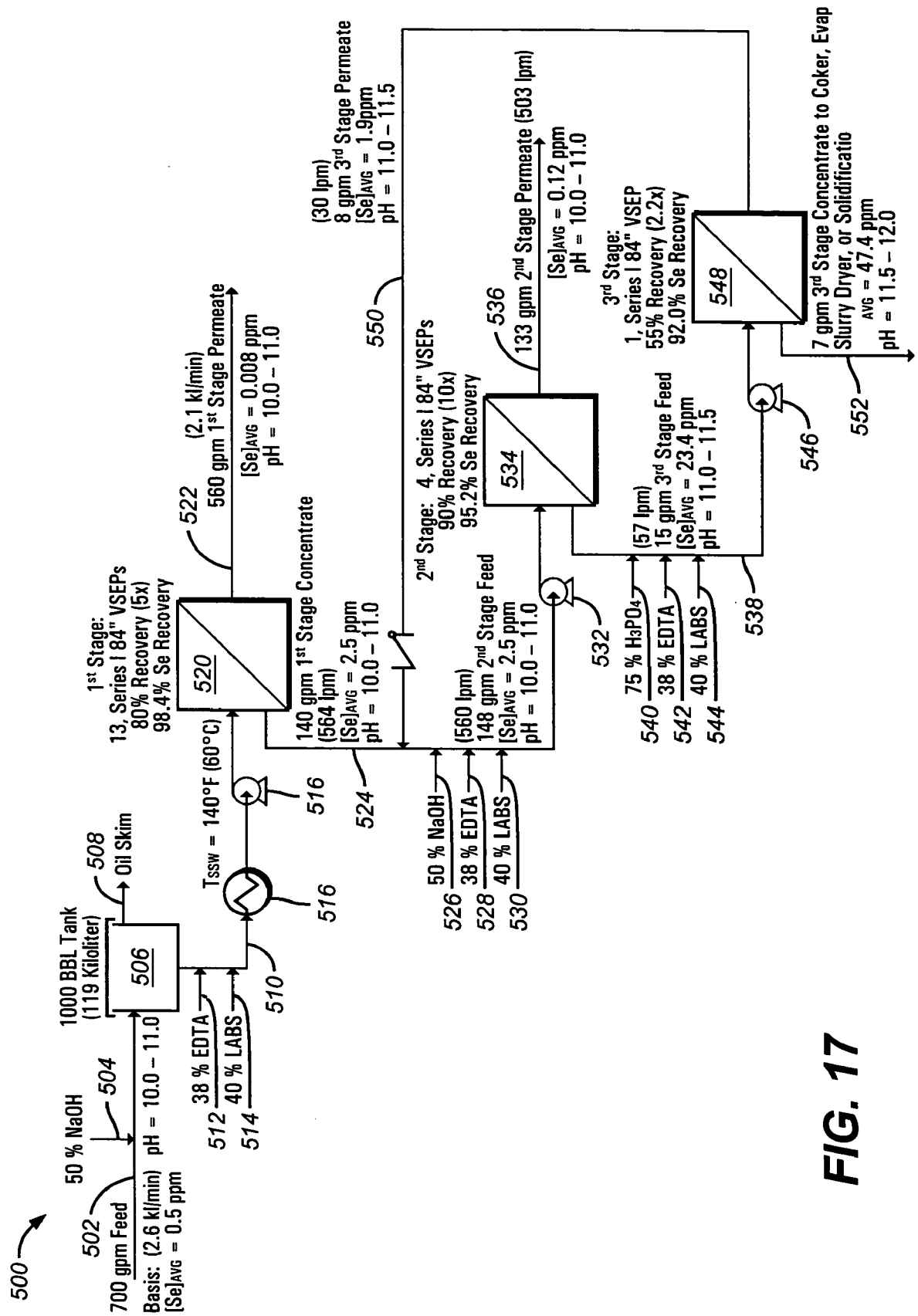
FIG. 17 is an alternate block flow chart of an embodiment separation method herein.

Shown in FIG. 17 is another embodiment of a SSW VSEP Selenium System Design. The selenium balance was calculated using VSEP data results. The Se removal process is generally referred to in FIG. 16 as 500, where SSW Feed 502 at a flow rate of 700 gpm (2.6 kiloliters/min) containing an average concentration of about 0.5 ppm Se was treated with a 50% NaOH metal precipitator solution 504 to give a pH between 10.0-11.0 prior to injection into a 1000 bbl (119 kiloliter) tank 506. Oil was skimmed from tank 506 via line 508.

Exit line 510 was treated with 38% EDTA introduced via line 512 and 40% LABS injected via line 514 prior to heat exchanger 516 which heated the SSW to 140° F. (60° C.) prior to pump 518 that introduced the stream into first stage VSEP module 520 that operated at 80% recovery giving 98.4% Se recovery. First stage 520 included 13 I-84 model VSEP® modules from New Logic Research, Inc. First stage permeate stream 522 containing an average Se concentration of 0.008 ppm at pH of 10.0-11.0 was withdrawn at 560 gpm (2.1 kiloliter/min). First stage concentrate was removed via line 524 having an average Se concentration of 2.5 ppm (pH=10.0-11.0) at 140 gpm (564 μm).

Into stream 524 was introduced via line 526 50% NaOH, via line 528 38% EDTA and via line 530 40% LABS to give 148 gpm (560 lpm) second stage feed (average Se concentration of 2.5 ppm and pH=10.0-11.0) to pump 532 and second stage VSEP module 534 after recycle stream 550. Second stage VSEP 534 included 4 I-84 model VSEP® modules giving 90% recovery and 95.2% Se recovery. Second stage permeate stream 536 was withdrawn containing an average Se concentration of 0.12 ppm and pH of 10.0-11.0 at 133 gpm (503 μm). Second stage concentrate was removed via line 538 having an average Se concentration of 23.4 ppm (pH=11.0-11.5) at 15 gpm (57 lpm).

Into stream 538 was introduced via line 540 75% $H_3PO_4$, via line 542 38% EDTA and via line 544 40% LABS before third stage feed to pump 546 and third stage VSEP module 548. Third stage VSEP 548 included one I-84 model VSEP® module giving 55% recovery and 92.0% Se recovery. Third stage permeate stream 550 was withdrawn containing an average Se concentration of 1.9 ppm and pH of 11.0-11.5 at 8 gpm (30 lpm) and recycled to stream 524. Third stage concentrate was removed via line 552 having an average Se concentration of 47.4 ppm (pH=11.5-12.0) at 7 gpm (26 lpm) and sent to a coker, an evaporator, a slurry dryer or a solidification process.

In another non-limiting embodiment of the invention, the metal component concentrate stream may be disposed of by a process involving subjecting a contaminated waste water stream to chemical concentration process described above that includes metal precipitators, and which produces a contaminants concentrate stream and a clean water stream. The contaminants concentrate stream may then be passed to a coker unit wherein it is used as coker elutriant to quench the coke. Further details of this non-limiting embodiment of the invention may be seen with reference to U.S. Pat. Nos. 5,376,262 and 5,846,404, both incorporated by reference herein in their entirety.

In the coke quenching embodiment of the invention herein, the use of at least one metal precipitator would be required. Additionally, in another non-limiting embodiment, the process would involve injecting the selenium-containing concentrate as an aqueous water stream into the coke drum containing hot solid coke to lower the temperature in the coke drum to a temperature range from lower than about 150° F. (66° C.) and above about 220° F. (104° C.), and/or later injecting a pressurized cutting water stream maintained at a pH below about 6.5 into the coke drum to break up the formed selenium-coke product.

Many modifications may be made in the methods of and implementation of this invention without departing from the spirit and scope thereof that are defined only in the appended claims. For example, the exact membranes and frequencies used may be different from those used explicitly mentioned or suggested here. Additionally, techniques and methods for enhancing separations of metal components other than those specifically mentioned may find utility in the methods of this invention. Various combinations of membranes, frequencies, metal precipitator additives and pressures besides those explicitly mentioned herein are expected to be useful.

We claim:

1. A method of filtering metal components from a colloidal suspension or solution comprising:
   placing the colloidal suspension or solution in a vessel, where the colloidal suspension or solution comprises a liquid and a metal component where the metal in the metal component is selected from the group consisting of metals with an atomic number greater than 10, and further comprises a metal precipitator selected from the group consisting of iron salts, aluminum salts, potassium salts, sodium salts, copper salts, metal sulfides, and metal hydroxides and mixtures thereof; and providing a leaf element in contact with the colloidal suspension or solution in the vessel, the leaf element comprising a membrane having an exterior surface and an interior surface, where the membrane is impermeable to the metal component of the colloidal suspension or solution, and the leaf element further comprises a support mounted at the interior surface of the membrane and sealed within the membrane; and
   in any order or concurrently:
   vibrating the leaf element tangentially relative to the exterior surface of the membrane to induce shearing between the exterior surface of the membrane and the colloidal suspension or solution; and
   applying a negative and/or positive pressure to the leaf element to urge permeation of the membrane by a purified liquid of the colloidal suspension or solution.

2. The method of claim 1 where applying pressure to the leaf element produces a metal component concentrate after permeation through the membrane by the purified liquid, and further comprising passing the metal component concentrate to a coke quencher as a coke quenching elutriant.

3. The method of claim 2 where the metal component concentrate is introduced into the coke drum to lower the temperature of the coke to a temperature below about 150° F. (66° C.) or to raise the temperature to above about 220° F. (104° C.).

4. The method of claim 2 further comprising injecting a pressurized cutting water stream maintained at a pH below about 6.5 is injected into the coke drum to thereby break up the coke.

5. The method of claim 1 in which the step of applying a negative and/or positive pressure to the leaf element includes applying at least a partial vacuum to the outlet of the leaf element.

6. The method of claim 1 in which applying a negative and positive pressure to the leaf element includes applying a positive pressure to the exterior surface of the membrane.

7. The method of claim 1 in which vibrating the leaf element to induce shearing on the exterior surface of the membrane induces the shearing to a magnitude of at least 5,000 seconds$^{-1}$.

8. The method of claim 1 in which vibrating the leaf element includes producing a displacement amplitude of the leaf member of between about 5 millimeters and about 50 millimeters.

9. The method of claim 1 in which vibrating the leaf element includes producing a vibration frequency of the leaf element of between about 5 Hertz and about 300 Hertz.

10. The method of claim 9 in which vibrating the leaf element is performed by vibrating a plurality of leaf elements immersed in the colloidal suspension or solution and vibrating the vessel.

11. The method of claim 1 in which vibrating the leaf element includes the step of vibrating the leaf element and the vessel.

12. A method of filtering metal components from a colloidal suspension or solution comprising:
   placing the colloidal suspension or solution in a vessel, where the colloidal suspension or solution comprises a liquid;

a metal component where the metal in the metal component is selected from the group consisting of metals with an atomic number greater than 10; and from about 5 to about 50,000 ppm of a metal precipitator selected from the group consisting of iron salts, aluminum salts, potassium salts, sodium salts, copper salts, metal sulfides, and metal hydroxides and mixtures thereof; and providing a leaf element in contact with the colloidal suspension or solution in the vessel, the leaf element comprising a membrane having an exterior surface and an interior surface, where the membrane is impermeable to the metal component of the colloidal suspension or solution, and the leaf element further comprises a support mounted at the interior surface of the membrane and sealed within the membrane; and in any order or concurrently:

vibrating the leaf element tangentially relative to the exterior surface of the membrane to induce shearing between the exterior surface of the membrane and the colloidal suspension or solution; and applying a negative and/or positive pressure to the leaf element to urge permeation of the membrane by a purified liquid of the colloidal suspension or solution.

13. The method of claim 12 where applying pressure to the leaf element produces a metal component concentrate after permeation through the membrane by the purified liquid, and further comprising passing the metal component concentrate to a coke quencher as a coke quenching elutriant.

14. The method of claim 13 where the metal component concentrate is introduced into the coke drum to lower the temperature of the coke to a temperature below about 150° F. (66° C.) or to raise the temperature to above about 220° F. (104° C.).

15. The method of claim 13 further comprising injecting a pressurized cutting water stream maintained at a pH below about 6.5 into the coke drum to break up the coke.

16. A method of filtering metal components from a colloidal suspension or solution comprising:

placing the colloidal suspension or solution in a vessel, where the colloidal suspension or solution comprises a liquid;

a metal component where the metal in the metal component is selected from the group consisting of metals with an atomic number greater than 10; and from about 5 to about 50,000 ppm of a metal precipitator selected from the group consisting of iron salts, aluminum salts, potassium salts, sodium salts, copper salts, metal sulfides, and metal hydroxides and mixtures thereof; and providing a leaf element in contact with the colloidal suspension or solution in the vessel, the leaf element comprising a membrane having an exterior surface and an interior surface, where the membrane is impermeable to the metal component of the colloidal suspension or solution, and the leaf element further comprises a support mounted at the interior surface of the membrane and sealed within the membrane; and in any order or concurrently:

vibrating the leaf element tangentially relative to the exterior surface of the membrane at a vibration frequency of between about 5 Hertz and about 300 Hertz to induce shearing between the exterior surface of the membrane and the colloidal suspension or solution;

applying a negative and/or positive pressure to the leaf element to urge permeation of the membrane by a purified liquid of the colloidal suspension or solution; and thereby producing a metal component concentrate after permeation through the membrane by the purified liquid; and passing the metal component concentrate to a coke quencher as a coke quenching elutriant.

* * * * *